G. W. PEEK.
TRACK LAYING TRACTOR.
APPLICATION FILED APR. 24, 1918.
1,319,242
Patented Oct. 21, 1919.
2 SHEETS—SHEET 1.
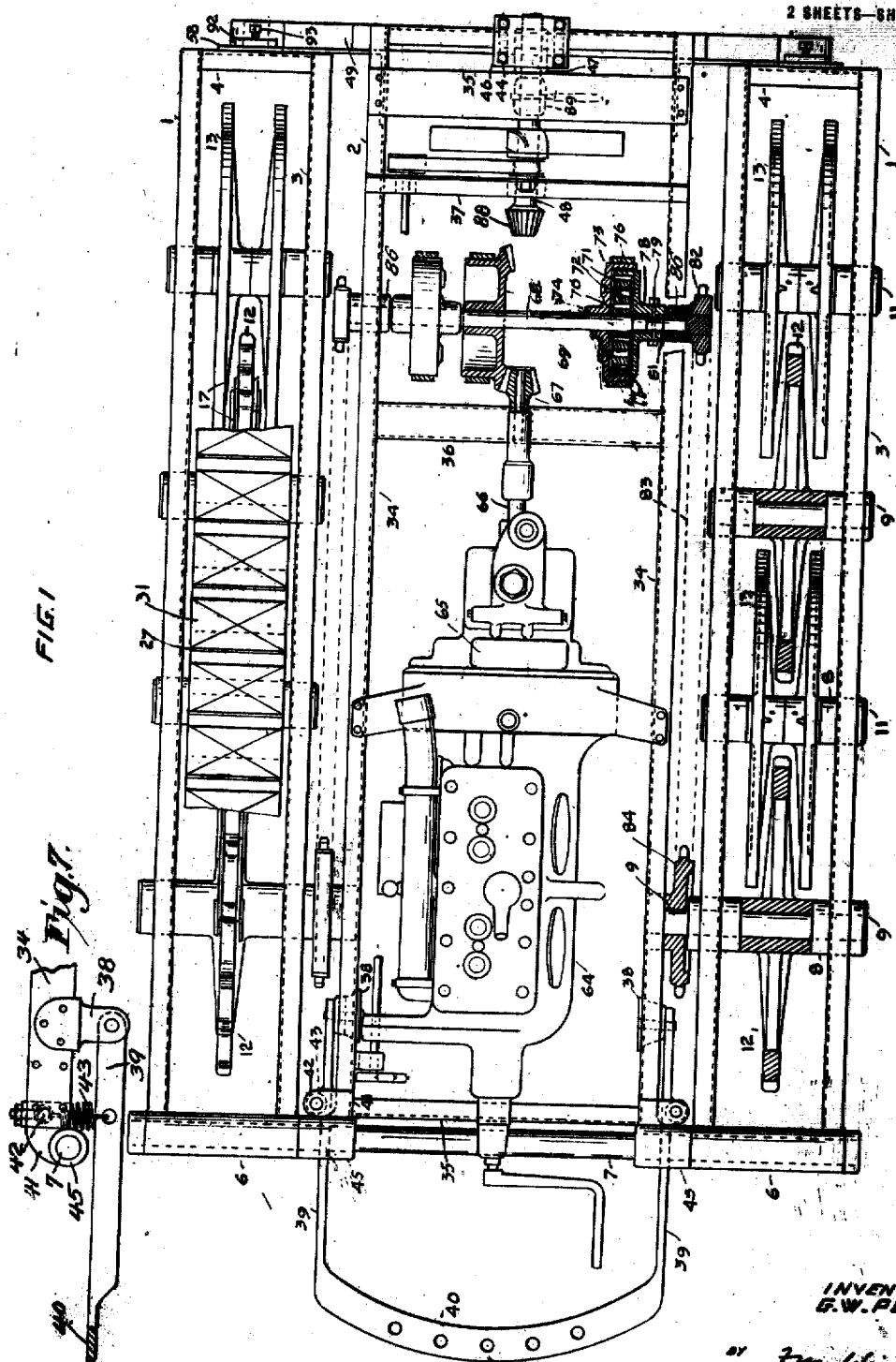
INVENTOR
G. W. PEEK
BY F. M. Wright

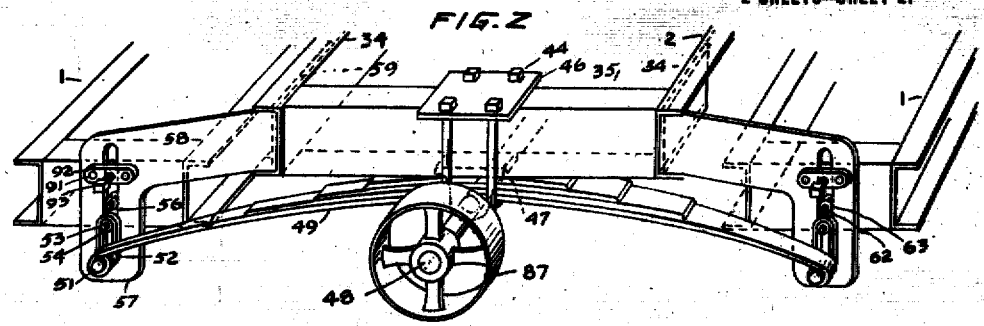
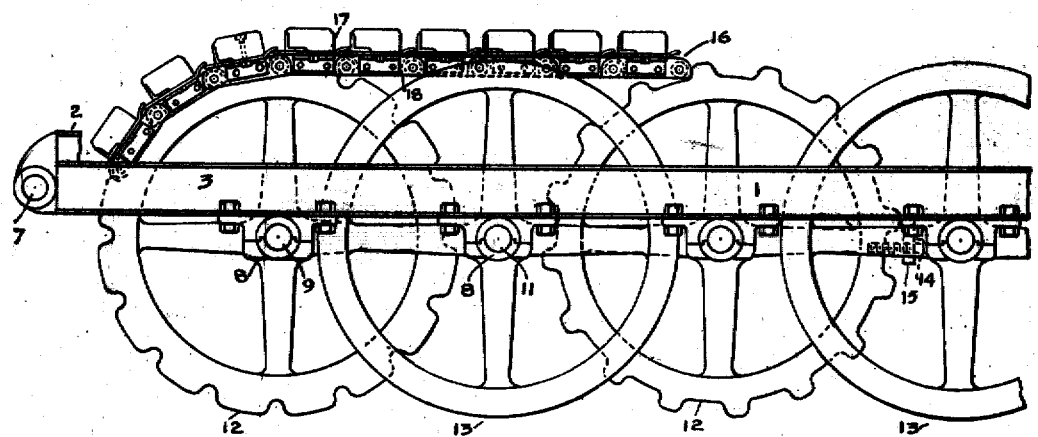
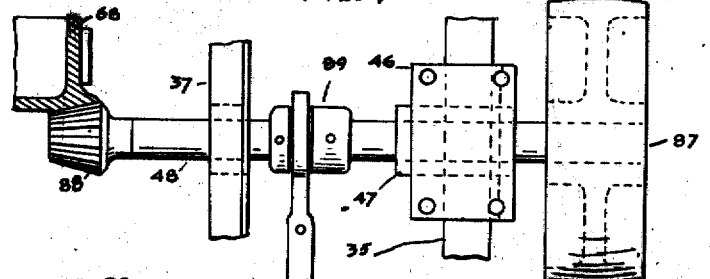
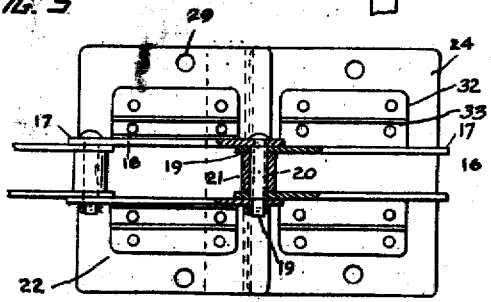
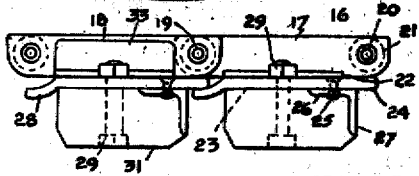

UNITED STATES PATENT OFFICE.

GEORGE W. PEEK, OF SAN FRANCISCO, CALIFORNIA.

TRACK-LAYING TRACTOR.

1,319,242.   Specification of Letters Patent.   Patented Oct. 21, 1919.

Application filed April 24, 1918. Serial No. 230,406.

*To all whom it may concern:*

Be it known that I, GEORGE W. PEEK, a citizen of the United States, residing at San Francisco, in the county of San Francisco and State of California, have invented new and useful Improvements in Track-Laying Tractors, of which the following is a specification.

The present invention relates to improvements in track-laying tractors.

The object of the invention is to provide a track-laying tractor of a low draft type in which the track-laying frames will not spread from, or crowd on, the main frame, while the machine is being turned; in which the motor-supporting frame will be firmly yet flexibly connected with the track-laying frames; which will have an improved construction of tread frames; in which the tread will be composed of links having interlocking parts and which can be easily detached from each other; which will contain improved steering mechanism and draft mechanism, so arranged that a direct pull is obtained upon the traveling implements or vehicle drawn by the tractor; which will be light in weight, and in which the weight will be distributed so as to afford a maximum pulling power; which will be simple, perfectly balanced, and easily controlled; which can be used, when desired, as a stationary source of power and in which, when so used, the motor-supporting frame will be rigidly connected to the track-laying frames; and which will have improved means for transmitting the power from the engine to the endless treads.

In the accompanying drawing, Figure 1 is a plan view of the tractor, the upper portions being removed, the parts being shown in horizontal section, and a pulley at the front end thereof being broken away; Fig. 2 is a perspective view thereof looking from the front; Fig. 3 is an enlarged broken side view of a tread frame; Fig. 4 is a broken top plan view of a shaft at the front end of the tractor, a pulley thereon being shown in section; Fig. 5 is a view from the inner side of a portion of a tread chain; Fig. 6 is a sectional view of the same. Fig. 7 is a side view of draw-bar as attached to the rear end of the motor supporting frame, showing particularly the resiliently supporting means thus permitting the draw pull to be transmitted to the draw-bar with directness.

Referring to the drawing, 1 indicates tread frames, one on each side of a tractor frame 2. Each tread frame comprises longitudinally extending channel irons 3 approximately of a length to equal the length of the motor-supporting frame, connected at their front ends by channel irons 4 and at their rear ends by a bearing 6 for a shaft 7. At suitable intervals there are supported by said channel irons bearings 8 for two transverse shafts 9 and two transverse shafts 11, the shafts 9 and 11 alternating with each other, the shafts 9 carrying driving sprocket wheels 12, and the shafts 11 carrying idler grooved wheels 13, the peripheries of the sprocket wheels being received in the grooves of the wheels 13. For the purpose of tightening an endless chain around said wheels the bearing for the shaft of the outside idler wheel is made adjustable, and is held in its adjusted position by means of a screw 14 screwed through a lug 15 depending from a channel iron 3 forming part of the frame 1.

Engaging the sprocket wheels of each tread frame is a sprocket chain 16 composed of links 17 having side members 18, the side members of adjacent links being held in place by bolts 19 and spaced from each other by bushings 20. Rollers 21 surround said bushings. Said links are bent outward at their outer edges to form flanges 22 to which shoes 24 are riveted, as shown at 23. Riveted, as shown at 25, to said shoes are members 26 of transversely extending angle irons 27, the other members of which extend outward from said shoes. One end of each shoe is bent outwardly, as shown at 28, and when the shoe is in alinement with the succeeding adjacent shoe, said end overlaps the adjacent end of the latter, and abuts against the outwardly extending member of the angle iron 27 attached thereto. Bolted to the outer sides of said shoes, as shown at 29, are transversely extending traction grips 31. Also riveted to the inner sides of said shoes are members 32, in planes parallel with the shafts 9, 11, of longitudinally extending angle irons 33, the other members of which are in planes at right angles to the perspective shoes, and extend into the grooves of the grooved wheels 13, to form guides for the chains around the wheels.

The tractor frame comprises longitudinally extending channel irons 34 connected at their ends to channel irons 35 and also connected transversely by a channel iron 36 and an angle iron 37. Secured to the inner sides of the channel irons 34 near their rear ends are brackets 38 which are bent outwardly, and to the lower ends of which are pivoted the sides 39 of a yoke-shaped drawbar 40. Secured to the rear ends of the channel iron 34 are rearwardly extending brackets 41 carrying bearings 45 for the shaft 7. By the shaft 7 the rear end of the tractor frame is pivotally supported upon the tread frames. From the brackets 41 depend screw-eyes 42 to which are attached the upper ends of coiled springs 43, the lower ends of which are attached to the sides of the draw-bar.

To the central portion of the front transverse channel iron 35 is attached by U-bolts 44 a bracket 46 having a bearing 47 for a shaft 48, and also attached by said U-bolts 44 is a carriage spring 49. The ends of the carriage spring are looped around pins 51 which depend from loops 52, the upper ends of which are suspended from pins 53 extending from the channel irons 4 and carrying rollers 54. Said rollers 54 extend into vertically directed slots 56 in vertically extending portions 57 of elbow plates 58, horizontal portions 59 of which extend outward from the channel irons 34, their inner ends being bent at right angles and secured, as shown at 61, to the front ends of said channel irons. In order to guide the plates vertically in their vibration there are secured to the channel irons 4 additional pins 62 which carry rollers 63 rolling in the slots 56.

The tractor frame carries on its rear portion an engine 64, approximately in the center, a transmission 65, and a driving shaft 66, which carries at its front end a bevel pinion 67 meshing with a bevel gear 68 secured to a transverse shaft 69. Said transverse shaft has secured adjacent to each end pinions 70 each of which meshes with pinions 71 on shafts 72 secured to a brake wheel 73 having a hub 74 loosely surrounding the shaft 69 and around which is a brake band 76. The pinions 71 mesh with internal gear teeth 77 on a wheel 78, pinned, as shown at 79, to a shaft 81 journaled in sleeve 86 which carries a sprocket wheel 82. Around said sprocket wheel 82 travel sprocket chains 83 which also travel around sprocket wheels 84 on the shafts 9 of the rear driving sprocket wheels 12 in the respective tread frames.

The tractor can be steered in any direction desired by releasing one or the other of the wheels 78 by means of separately actuated braking levers (not shown) of the usual construction.

The shaft 48 carries a pulley 87, and, in the ordinary operation of the tractor, is disconnected from the driving shaft 66, but may be operatively connected thereto, when it is desired to derive power from the engine of the tractor for operating machinery other than that of the tractor, by means of a pinion 88 carried on its rear end, which, by means of a clutch 89 of ordinary construction may be caused to mesh with the bevel gear 68 on the shaft 69.

To the vertical member of each elbow plate is secured by lugs 91, screwed into said plate on opposite sides of the vertical slot therein, a bar 92, through the center of which can be screwed a set screw 93, which can extend through the slot and bear against the front end of the tread frame, to hold said tractor frame rigid with reference to the tread frames when it is desired to use the pulley 87.

I claim:—

1. In a tractor, the combination of a pair of traction belt frames, a main frame pivotally connected to said belt frames, means for permitting relative vertical movement of the main frame and the belt frames and for preventing relative lateral movement thereof comprising for each belt frame an elbow extension plate secured to the main frame and having a vertical slot in an arm thereof, a pin on the belt frame projecting into said slot and guided thereby.

2. In a tractor, the combination of a pair of traction belt frames, a main frame pivotally supported on the belt frames, means for permitting relative vertical movement of the main frame and the belt frames and for preventing relative lateral movement thereof comprising for each belt frame a lateral extension projecting from the main frame and having a vertical slot therein, a pin on the belt frame projecting into said slot to be guided by the latter, and a cushion means secured to the main frame and to said pin.

3. In a tractor, the combination of a pair of traction belt frames, a main frame pivotally supported on the belt frames, means for permitting relative vertical movement of the main frame and the belt frames and for preventing relative lateral movement thereof comprising for each belt frame a lateral extension projecting from the main frame and having a vertical slot therein, means on the belt frame projecting into said slot and guided thereby, and locking means between said extension and belt frame for preventing relative movement between the belt and main frames.

4. In a tractor, the combination of a pair of traction belt frames, a main frame pivotally connected to said belt frames, means for permitting relative vertical movement of the main frame and the belt frames and for preventing relative lateral movement thereof comprising for each belt frame an elbow extension plate secured to the main frame and having a vertical slot in an arm thereof, a pin on the belt frame projecting into said slot and guided thereby, a locking bolt on the extension and engageable with the belt frame for preventing relative movement between the belt and main frames.

5. In a tractor, the combination of a pair of traction belt frames, a main frame pivotally supported on the belt frames, means for permitting relative vertical movement of the main frame and the belt frames and for preventing relative lateral movement thereof comprising for each belt frame a lateral extension projecting from the main frame and having a vertical slot therein, a pin on the belt frame projecting into said slot and guided thereby, a link member loose on the pin and suspended therefrom, a leaf spring secured to the main frame and having the end portions thereof each secured to one of said link members of the respective belt frames.

6. In a tractor, a pair of traction belt frames, a main frame having supporting connections with the belt frames, one of said connections comprising a shaft extended through alined bearings in said belt and main frames, a belt driving means on each belt frame in advance of said shaft, a traction belt in each of said respective frames and looping said driving means and also in advance of said shaft, means on the main frame for actuating said belt.

7. In a tractor, a pair of traction belt frames, a main frame having supporting connections with the belt frames, one of said connections comprising a shaft extended through alined bearings in said belt and main frames, a belt driving means on each belt frame in advance of said shaft, a traction belt in each of said respective frames and looping said driving means and also in advance of said shaft, means on the main frame for actuating said belt, the other of said connections comprising means resiliently connecting the main and belt frames.

8. In combination a main frame, a motor supported thereby, a transverse shaft rotated by said motor, tread frames one on each side of the main frame, traction belts in the tread frames, means whereby said belts support said frame, a shaft extending from the front end of said main frame, means whereby said shaft can be rotated by the motor, a pulley on said shaft, and means for rigidly connecting the main frame with the tread frame, when desired.

9. In a wheel substitute, a frame, a plurality of load supporting wheels mounted in the frame and all of the same diameter, the treads of every other wheel being divided to receive and accommodate the adjacent wheel over-lapping the same, the combination with a traction belt looping around and supported by all said wheels and composed of linked sections, the peripheries of said over-lapping adjacent wheels being notched to receive the link connection of the belt, and a drive wheel on said frame engaging said belt.

10. In a wheel substitute, a frame, a series of load supporting wheels mounted on said frame and being all of the same diameter and having their axes in horizontal alinement, the peripheries of every other wheel being divided to receive and accommodate the adjacent wheel over-lapping the same for a distance substantially equal to its radius, the combination with a traction belt supported by and looping said wheels, and composed of a series of linked sections, said adjacent over-lapping wheels of said series having notched peripheries to receive the linked connections of said belt, and a drive sprocket having the same diameter of said supporting wheels and mounted on the frame at an end of said series of wheels, said sprocket having its toothed portion engaging the linked connections of said belt.

11. In a wheel substitute, a frame, a horizontal series of load supporting wheels mounted in the frame and all of the same diameter, the peripheries of every other wheel being divided to receive and accommodate the adjacent wheel over-lapping the same, the combination with a traction belt looping around and supported by all of said wheels and composed of linked sections, the peripheries of said over-lapping adjacent wheels being notched to receive the link connections of the belt, and a drive wheel on said frame engaging the belt, an end wheel of said series being horizontally adjustable on said frame.

12. In a wheel substitute, a frame, a series of load supporting wheels mounted on said frame and being all of the same diameter and having their axes in horizontal alinement, the treads of every other wheel being divided to receive and accommodate the adjacent wheel over-lapping the same for a distance substantially equal to its radius, the combination with a traction belt supported by and looping said wheels and composed of a series of linked sections, said belt having spaced pathways for the divided tread wheels and having the link connections disposed between said pathways, said adjacent over-lapping wheels of said series having notched peripheries to receive the linked connections of said belt, and a drive sprocket mounted on the frame at an end of said series of wheels, said sprocket having its toothed portion engaging the linked connections of said belt.

G. W. PEEK.